United States Patent
Ye et al.

(10) Patent No.: US 8,827,101 B2
(45) Date of Patent: Sep. 9, 2014

(54) KITCHEN APPLIANCE AND METHOD OF USING SAME

(75) Inventors: Guoyao Ye, Glen Allen, VA (US); Michael Garman, Midlothian, VA (US); Michael G. Sandford, Chester, VA (US); Mark C. Steiner, Midlothian, VA (US); Arthur Wayne Hudgins, Richmond, VA (US)

(73) Assignee: Hamilton Beach Brands, Inc., Glen Allen ( * ) Notice: Subject to any disclaimer, the term of this patent is extended or adjusted under 35 U.S.C. 154(b) by 27 days.

(21) Appl. No.: 13/476,080

(22) Filed: May 21, 2012

(65) Prior Publication Data
US 2013/0306638 A1 Nov. 21, 2013

(51) Int. Cl.
 *B65D 45/00* (2006.01)
 *B65D 25/28* (2006.01)
 *A47J 27/00* (2006.01)
 *A47J 36/10* (2006.01)

(52) U.S. Cl.
 CPC .............. *A47J 36/10* (2013.01); *A47J 27/002* (2013.01); *Y10S 220/9151* (2013.01)
 USPC ............... 220/318; 220/212.5; 220/573.1; 220/915.1

(58) Field of Classification Search
 USPC ............. 220/212.5, 318, 573.1, 592.22, 752, 220/756, 762, 915.1, 915.2; 206/549; 16/111.1, 443
 See application file for complete search history.

(56) References Cited

U.S. PATENT DOCUMENTS

| | | |
|---|---|---|
| RE3,080 E | 8/1868 | Squire |
| 148,130 A | 3/1874 | Moore |
| 192,453 A | 6/1877 | Purdy |
| 223,013 A | 12/1879 | Shirley et al. |
| 323,101 A | 7/1885 | Bard |
| 398,539 A | 2/1889 | Rock |
| 466,648 A | 1/1892 | Young |
| 862,908 A | 8/1907 | Hawkinson |
| 899,084 A | 9/1908 | Thoits et al. |

(Continued)

FOREIGN PATENT DOCUMENTS

EP 0168985 1/1986

OTHER PUBLICATIONS

Toastmaster, Cookin' in Style, Portable Slow Cooker, 2004, 2 pages.

(Continued)

*Primary Examiner* — Steven A. Reynolds
*Assistant Examiner* — Javier A Pagan
(74) *Attorney, Agent, or Firm* — Alexander D. Raring

(57) ABSTRACT

A kitchen appliance includes a housing that defines a cavity. The housing has a housing rim defining an opening to the cavity. A heating or cooling element is disposed within the housing to heat or cool the cavity. A container has a generally hollow interior and a container rim. A lid is sized and shaped to at least partially cover the opening of the container when placed on the container. The lid has an exterior surface and an opposing interior surface. At least one handle is pivotally mounted to one of the exterior surface of the side wall of the housing and the exterior surface of the lid. The handle is pivotable between an engaged position to retain the lid in sealing engagement with the container rim and disengage position to permit the lid to be removed from the container rim.

12 Claims, 9 Drawing Sheets

(56) References Cited

U.S. PATENT DOCUMENTS

| | | | |
|---|---|---|---|
| 951,916 | A | 3/1910 | Leighty |
| 961,963 | A | 6/1910 | Hughes |
| 1,065,667 | A | 6/1913 | Donnell |
| 1,084,817 | A | 1/1914 | Parkinson |
| 1,204,715 | A | 11/1916 | Taylor |
| 1,207,974 | A | 12/1916 | Miller |
| 1,232,385 | A | 7/1917 | Palmer |
| 1,271,230 | A | 7/1918 | Sabo |
| 1,300,712 | A | 4/1919 | Ferdon |
| 1,336,491 | A | 4/1920 | Stern |
| 1,367,739 | A | 2/1921 | Hibbard |
| 1,410,515 | A | 3/1922 | Saddlemire |
| 1,438,706 | A | 12/1922 | Hegenberg |
| 1,451,545 | A | 4/1923 | Ingersoll |
| 1,483,255 | A | 2/1924 | Tonge |
| 1,513,581 | A | 3/1924 | Caumont |
| 1,531,772 | A | 3/1925 | Wentorf et al. |
| 1,698,928 | A | 1/1929 | Wentorf et al. |
| RE17,398 | E | 8/1929 | Kircher |
| 1,765,135 | A | 6/1930 | Doland |
| 1,771,294 | A | 7/1930 | Hackett |
| 1,802,557 | A | 4/1931 | Hight |
| 2,223,432 | A | 12/1940 | Smith |
| D129,108 | S | 8/1941 | Sprague |
| 2,526,050 | A | 10/1950 | Schweiso |
| 2,636,639 | A | 4/1953 | Frey |
| 2,817,552 | A | 12/1957 | Bruel |
| 2,846,257 | A | 8/1958 | Sherrill |
| 2,974,990 | A | 3/1961 | Mereness |
| 3,124,381 | A | 3/1964 | Geldart |
| 3,133,665 | A | 5/1964 | Colhouer |
| 3,140,795 | A | 7/1964 | Griffith et al. |
| 3,174,787 | A | 3/1965 | Kolman |
| 3,291,515 | A | 12/1966 | Lierman |
| 3,363,924 | A | 1/1968 | Remig |
| 3,577,908 | A | 5/1971 | Burg |
| 3,589,760 | A | 6/1971 | Williams |
| 3,635,371 | A | 1/1972 | Oxel |
| 3,674,298 | A | 7/1972 | Vekony |
| 3,746,205 | A | 7/1973 | Helguera |
| 3,746,837 | A | 7/1973 | Frey et al. |
| 3,769,899 | A | 11/1973 | Kostko |
| 3,791,368 | A | 2/1974 | Hunt |
| 4,095,830 | A | 6/1978 | Spellman |
| 4,241,846 | A | 12/1980 | Murphy |
| 4,307,287 | A | 12/1981 | Weiss |
| 4,375,711 | A | 3/1983 | Franzen et al. |
| 4,492,853 | A | 1/1985 | Lam |
| 4,545,501 | A | 10/1985 | DeFord |
| D298,899 | S | 12/1988 | Blum et al. |
| D307,531 | S | 5/1990 | Ishida |
| D313,727 | S | 1/1991 | Gamez |
| 5,046,633 | A | 9/1991 | Chung |
| 5,097,107 | A | 3/1992 | Watkins et al. |
| 5,129,314 | A | 7/1992 | Hu |
| D338,370 | S | 8/1993 | Takeda |
| D341,058 | S | 11/1993 | Slany et al. |
| 5,337,910 | A | 8/1994 | Picozza et al. |
| 5,355,777 | A | 10/1994 | Chen et al. |
| 5,415,082 | A | 5/1995 | Nagao |
| D368,620 | S | 4/1996 | Piret |
| D370,826 | S | 6/1996 | Thurlow |
| 5,567,458 | A | 10/1996 | Wu |
| 5,643,481 | A | 7/1997 | Brotzki et al. |
| 5,678,790 | A | 10/1997 | Dwyer |
| 5,687,879 | A | 11/1997 | King et al. |
| D388,657 | S | 1/1998 | Bacharowski |
| 5,715,570 | A | 2/1998 | Hyun |
| 5,786,568 | A | 7/1998 | McKinney |
| 5,829,342 | A | 11/1998 | Lee |
| 5,945,024 | A | 8/1999 | Fukunaga et al. |
| 6,062,130 | A | 5/2000 | Brady |
| 6,102,238 | A | 8/2000 | Brady et al. |
| 6,109,169 | A | 8/2000 | Masel et al. |
| 6,587,739 | B1 | 7/2003 | Abrams |
| 6,606,987 | B2 | 8/2003 | DeMars |
| 6,772,677 | B2 | 8/2004 | Marotel et al. |
| 6,776,085 | B1 | 8/2004 | Tang |
| 6,987,247 | B2 * | 1/2006 | Schaffeld et al. ............. 219/438 |
| D528,353 | S | 9/2006 | Brady et al. |
| 7,140,506 | B1 | 11/2006 | Brady et al. |
| 7,167,642 | B1 | 1/2007 | Wagner |
| 7,485,831 | B2 | 2/2009 | Tynes et al. |
| 7,706,671 | B2 | 4/2010 | Brown |
| 7,717,028 | B2 | 5/2010 | Serra |
| 7,947,928 | B2 | 5/2011 | Tynes et al. |
| D642,856 | S | 8/2011 | Bock et al. |
| D649,831 | S | 12/2011 | Romandy |
| 8,109,201 | B2 | 2/2012 | Schandel et al. |
| D657,611 | S | 4/2012 | Bock |
| 2002/0073851 | A1 | 6/2002 | Chung et al. |
| 2003/0234205 | A1 | 12/2003 | McGuyer et al. |
| 2005/0145615 | A1 | 7/2005 | Schaffeld et al. |
| 2008/0084144 | A1 | 4/2008 | D'Ambrosio |
| 2009/0039071 | A1 | 2/2009 | Tynes et al. |
| 2009/0218355 | A1 | 9/2009 | Chameroy et al. |
| 2009/0272279 | A1 | 11/2009 | Kieck |
| 2010/0059460 | A1 | 3/2010 | Mulaw |
| 2011/0061545 | A1 | 3/2011 | Foster et al. |

OTHER PUBLICATIONS

Brian Krepshaw, Back to Work Gets Tastier, Crock-Pot SCCPLC2w00-G Lunch Crock Food Warmer, Jan. 3, 2012, 2 pages.

Ella Grace, Inc., SecureLid™ Product Description and Key Features, 2004, 2 pages.

* cited by examiner

KITCHEN APPLIANCE AND METHOD OF USING SAME

BACKGROUND OF THE DISCLOSURE

The present disclosure relates generally to a kitchen appliance and, more particularly, to a slow cooker that can be easily transported with little or no spillage of contents therein.

Kitchen appliances, and particularly slow cookers, are well known. Conventional slow cookers are generally sized and shaped to allow a user to pick-up and move or transport the slow cooker from one location to another. Often, the user may want to move the slow cooker after it is loaded with contents, such as foodstuff to be cooked and/or other contents to be heated.

However, it can be difficult to move or transport conventional slow cookers when foodstuff, particularly liquid, has been placed therein without spilling some of the foodstuff. The components of conventional slow cookers are not made to close tolerances, and any lid of a conventional slow cooker is typically not securely engaged with a container of the slow cooker when in a closed position. This creates a potential for the lid to inadvertently slide off the container when the slow cooker is being carried from one location to another. Also, because the lid is not usually engaged with a tight fit and because foodstuff cooked in a slow cooker, such as soup, chili, stew, etc., typically has a significant liquid content, there exists the potential of significant spillage if the slow cooker is tilted during transport.

It has heretofore not been discovered how to make the engagement and sealing of the lid to the container of a slow cooker simpler and more user friendly. The device of the present disclosure overcomes and/or eliminates at least one of the above or other shortcomings of conventional appliances.

BRIEF SUMMARY OF THE DISCLOSURE

Briefly stated, a preferred embodiment of the present disclosure is directed to a kitchen appliance having a housing with a base and a side wall extending therefrom. The side wall has an exterior surface and an opposing interior surface. At least portions of the interior surface of the side wall and base define a cavity within the housing. The housing has a housing rim at a first, free edge of the side wall defining an opening to the cavity. A heating or cooling element is disposed within the housing proximate the cavity to heat or cool the cavity. A container has a generally hollow interior and a container rim defining an opening for accessing the interior thereof. The interior of the container is capable of retaining contents therein. The container is sized and shaped to fit within the cavity of the housing. A lid is sized and shaped to at least partially cover the opening of the container when placed on the container. The lid has an exterior surface and an opposing interior surface facing the interior of the container when the lid is placed on the container. At least one handle is pivotally mounted to one of the exterior surface of the side wall of the housing and the exterior surface of the lid. The handle is pivotable between an engaged position which at least a portion of the handle contacts one of the lid and the side wall of the housing to retain the lid in sealing engagement with the container rim to inhibit linkage of the contents from the interior of the container and disengage position in which the portion of the handle is spaced-apart from the other one of the lid and the side wall of the housing to permit the lid to be removed from the container rim.

In another aspect, a preferred embodiment of the present disclosure is directed to a kitchen appliance having a housing with a base and a side wall extending therefrom. The side wall has an exterior surface and an opposing interior surface. At least portions of the interior surface of the side wall and base define a cavity within the housing. The housing has a housing rim at a first, free edge of the side wall defining an opening to the cavity. A heating or cooling element is disposed within the housing proximate the cavity to heat or cool the cavity. A container has a generally hollow interior and a container rim defining an opening for accessing the interior thereof. The interior of the container is capable of retaining contents therein. The container is sized and shaped to fit within the cavity of the housing. A lid is sized and shaped to at least partially cover the opening of the container when placed on the container. The lid has an exterior surface and an opposing interior surface facing the interior of the container when the lid is placed on the container. A gasket extends around one of an outer edge of the lid and the container rim for sealing engagement with the other of the container rim and the outer edge of the lid. At least one handle is mounted to the exterior surface of the side wall of the housing and is positioned completely below the housing rim. At least one latching mechanism is mounted to one of the exterior surface of the side wall of the housing and the exterior surface of the lid. The at least one latching mechanism is an over-the-center clip having a hook and a lever. The at least one latching mechanism having an engaged position to retain the lid in sealing engagement with the container rim for inhibiting leakage of the contents from the interior of the container and a disengaged position to permit the lid to be removed from the container rim. At least a portion of the hook contacting at least a portion of the handle in the disengaged position.

In yet another aspect, a preferred embodiment of the present disclosure is directed to a kitchen appliance having a housing with a base and a side wall extending therefrom. The side wall has an exterior surface and an opposing interior surface. At least portions of the interior surface of the side wall and base define a cavity within the housing. The housing has a housing rim at a first, free edge of the side wall defining an opening to the cavity. A heating or cooling element is disposed within the housing proximate the cavity to heat or cool the cavity. A container has a generally hollow interior and a container rim defining an opening for accessing the interior thereof. The interior of the container is capable of retaining contents therein. The container is sized and shaped to fit within the cavity of the housing. A lid is sized and shaped to at least partially cover the opening of the container when placed on the container. The lid has an exterior surface and an opposing interior surface facing the interior of the container when the lid is placed on the container. At least one catch is mounted to one of the exterior surface of the lid and the exterior surface of the side wall of the housing. The at least one catch extends outwardly beyond the outer edge of the lid or upwardly beyond the side wall of the housing. At least a portion of the catch is resiliently flexible or bendable. At least one tab is rotatably mounted to one of the exterior surface of the side wall of the housing and the exterior surface of the lid. At least a portion of the catch is positionable around at least a portion of the tab. The tab is rotatable between a first position in which the tab applies a force on the catch to retain the lid in sealing engagement with the container rim for inhibiting leakage of the contents from the interior of the container and a second position in which the catch is capable of being disengaged from the tab to permit the lid to be removed from the container rim.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the invention is not limited to the precise arrangements and instrumentalities shown. In the drawings.

DETAILED DESCRIPTION OF THE DISCLOSURE

Figure 1:
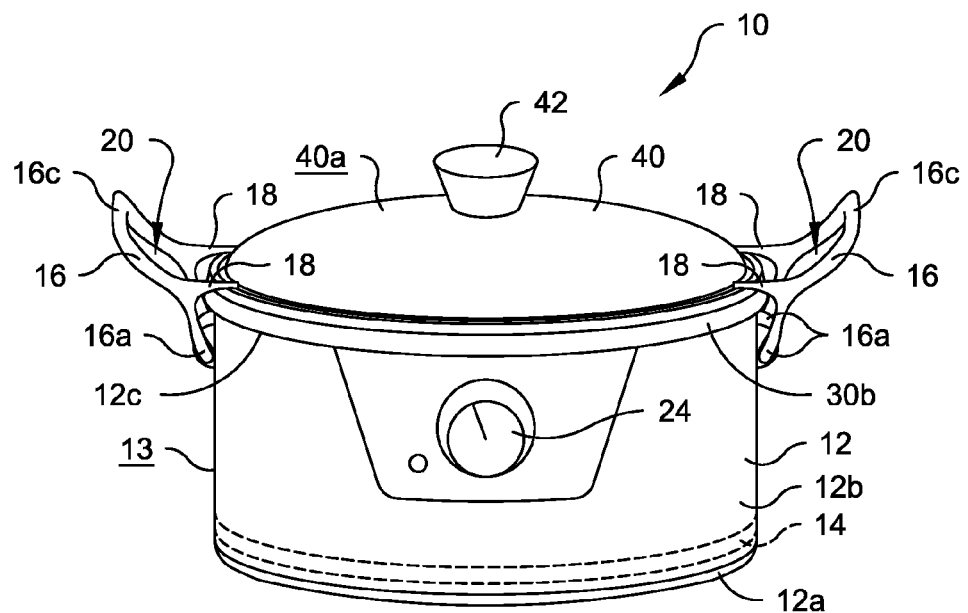
FIG. 1 is a top front perspective view of a kitchen appliance according to a first preferred embodiment of the present disclosure, wherein a handle is in an engaged position.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the kitchen appliance, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Figure 2:
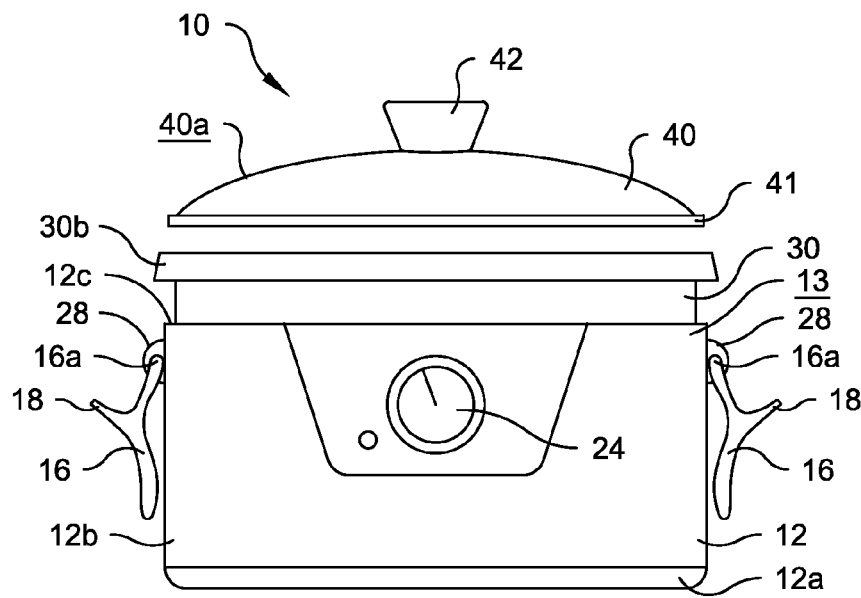
FIG. 2 is a partially exploded top front perspective view thereof, wherein the handle is in a disengaged position.

Referring to the drawings in detail, wherein like numerals indicate like elements throughout, FIGS. 1 and 2 show a kitchen appliance, generally designated 10, according to a first preferred embodiment of the present disclosure. The kitchen appliance 10 is illustrated as a slow cooker for warming and/or cooking (collectively referred to as heating) contents (none shown), such as foodstuff or another object, therein. However, the present disclosure is not limited to such a device or functionality. For example, the kitchen appliance 10 may be any of a variety of devices typically used in a kitchen, such as a deep fryer, roaster oven, or the like. In fact, the kitchen appliance 10 could be any type of device having a lid and a container, as described in detail below. The term "foodstuff," as used herein, is sufficiently broad to cover any substance that is capable of being consumed by a user, such as a pork roast, vegetables, water, milk or the like, or any combination thereof. The kitchen appliance 10 is also capable of heating or cooling one or more objects (not shown) other than foodstuff, such as a baby's bottle, one or more stones or towels for a massage, or the like.

Referring to FIGS. 1 and 2, the kitchen appliance 10 includes a housing 12 having a base 12a and a side wall 12b extending therefrom. The side wall 12b preferably extends at least generally perpendicularly to the base 12a. The side wall 12b includes an exterior surface 13 that faces and/or is exposed to the external environment and an opposing interior surface (not shown). At least portions of the interior surface of the side wall 12b and an interior or upper surface of the base 12a surround and/or define a cavity of the housing 12. As shown in FIG. 2, the housing 12 also includes a housing rim 12c at an upper free edge of the side wall 12b. The housing rim 12c surrounds and/or defines an opening to the cavity of the housing 12.

Preferably, the base 12a, the side wall 12b and the housing rim 12c are generally ovular or elliptical in shape when viewed from above or below. Thus, the housing 12 preferably has a major axis $A_1$ and a minor axis $A_2$ (not shown in FIGS. 1 and 2, but see the second preferred embodiment shown in FIG. 3). The minor axis $A_2$ extends at least generally, and preferably exactly, perpendicularly to the major axis $A_1$. While the ovular or elliptical shape is preferred, the base 12a may have a different shape, such as, but not limited to, circular or rectangular in plan view. The base 12a may include several generally spaced-apart, rounded protrusions or feet (not shown) extending downwardly from a bottom surface thereof for supporting the kitchen appliance 10 on a support surface (not shown), such as a countertop, and spacing the bottom surface of the base 12a at least slightly above the support surface. Alternatively, the kitchen appliance 10 may include no feet, such that the kitchen appliance 10 is supported by the bottom surface of the base 12a directly on the support surface.

Referring specifically to FIG. 1, a heating or cooling element 14 (shown in phantom) is preferably disposed within the housing 12 proximate the cavity to heat and/or cool the cavity. The heating or cooling element 14 may be located within or on the interior surface of the side wall 12b of the housing 12, or may be disposed within the base 12a of the housing 12 in addition to or instead of the side wall 12b. The heating or cooling element 14 may be electrically powered and is preferably a resistance-type heating element, such as a calrod or mica board heating element. However, a different type of heating or cooling element may be used, provided the heating or cooling element functions to heat and/or cool the cavity of the housing 12.

A control knob 24 preferably extends outwardly from the side wall 12b of the housing 12 to enable a user to control the heating or cooling element 14. Thus, the control knob 24 is preferably operatively connected to the heating or cooling element 14. It is preferred that rotation of the knob 24 by a user toggles the heating or cooling element 14 between at least one "on" setting and an "off" setting. It is further preferred that the heating or cooling element 14 have at least two "on" settings, specifically a "high" heat setting and a "low" heat setting. Although two heat settings are preferred, it is further contemplated that alternate configurations may be used, such as, but not limited to, rotation of the knob 24 actuating a thermostat (not shown) to cause the heating or cooling element 14 to heat and/or cool the cavity of the housing 12 to a specific user selected temperature. The kitchen appliance 10 is not limited to the size, shape, configuration and/or functionality of the control knob 24 shown and described herein. Instead, the kitchen appliance 10 may have a control interface (not shown), with one or more buttons, switches or the like, in addition to or in place of the control knob 24.

Referring to FIGS. 1 and 2, the kitchen appliance 10 preferably includes a container 30 sized and/or shaped to fit within the cavity of the housing 12 for heating and/or cooling thereof by the heating or cooling element 14. More specifically, an exterior of the container 30 is preferably at least slightly smaller than the interior of the cavity of the housing 12, such that at least a majority of the container 30 fits within the cavity of the housing 12. The container 30 is preferably made of stoneware or ceramic. However, the container 30 may be made of a different material, such as cast iron with a porcelain enamel coating, for instance, provided the container 30 is capable of functioning as described herein. Additionally, it is preferable that the container 30 be easily removable from the housing 12 to facilitate cleaning thereof without exposing the housing 12, and specifically the heating or cooling element 14 and other electrical components thereof, to water and/or cleaning detergents or solvents.

Figure 4:
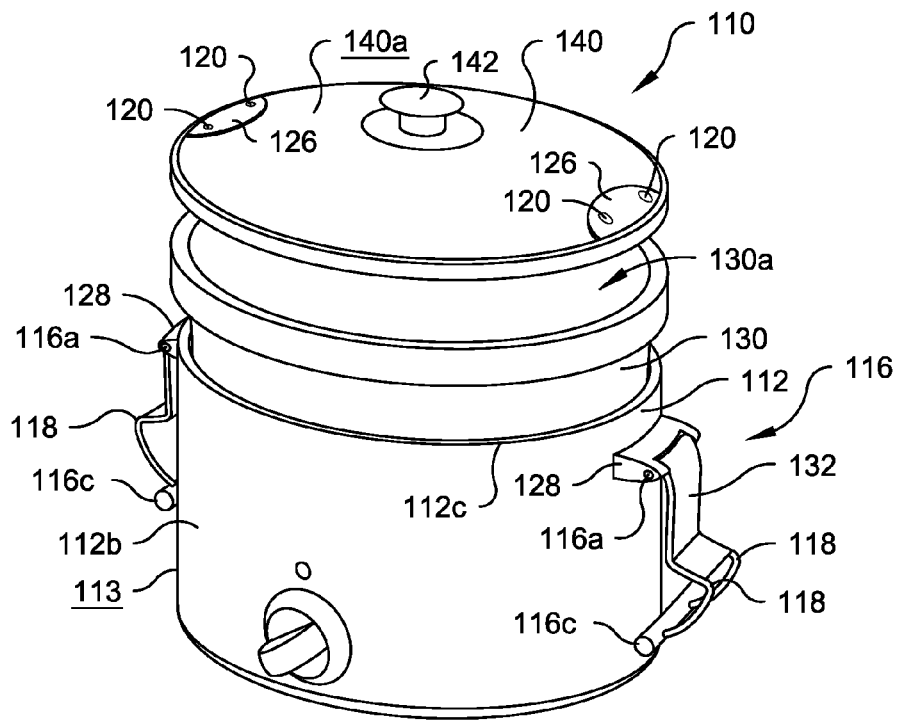
FIG. 4 is a partially exploded top front perspective view thereof, wherein the handle is in the disengaged position.

The container 30 preferably includes a generally hollow interior (not shown in FIGS. 1 and 2, but see the interior 130a of the container 130 of the second preferred embodiment shown in FIG. 4). A container rim 30b preferably defines an opening for accessing the interior of the container 30. The interior of the container 30 is capable of retaining the contents therein. The phrase "container rim," as used herein, may simply be a top or upper-most horizontal edge of a side wall of the container 30. Additionally and/or alternatively, the phrase "container rim" may be at least a portion of a ledge (not shown in FIGS. 1 and 2, but see the ledges 230b', 330b' of the third and fourth preferred embodiments shown in FIGS. 6 and 8, respectively) spaced inwardly and at least slightly downwardly from the upper-most horizontal edge of the side wall of the container 30.

Referring to again FIGS. 1 and 2, the kitchen appliance 10 preferably includes a lid 40 sized and shaped to at least partially and preferably completely cover the opening of the container 30 when the lid 40 is placed on or adjacent to the container rim 30b. The lid 40 includes a top or exterior surface 40a and an opposing bottom or interior surface (not shown) that faces the interior of the container 30 when the lid 40 is placed on or adjacent to the container rim 30b. A lid handle 42 preferably extends outwardly or upwardly from the exterior surface 40a of the lid 40. Preferably, the lid 40 has at least a slightly arcuate shape, such that the exterior surface 40a is generally convex and the interior surface is generally concave. Alternatively, at least one or both of the exterior surface 40a and the interior surface of the lid 40 may be at least partially or entirely flat. The lid 40 is preferably predominantly made of glass, although the lid 40 may be made of a different, preferably transparent or translucent material, such as a polymeric material, for instance, provided the lid 40 functions as described herein.

The lid 40 is preferably generally ovular or elliptical when viewed from above or below to correspond to or at least generally match the shape of the opening of the container 30. Preferably, when placed on the container rim 30b, the lid 40 covers the entire opening of the container 30 such that an entire outer periphery of the lid 40 engages and/or is placed adjacent to the container rim 30b. The lid 40 is shown herein to have an outer periphery and a diameter that is at least slightly smaller than an outer periphery and a diameter of the container rim 30b, because at least a portion of the outer periphery of the lid 40 rests on the ledge (see FIG. 7) at least slightly inwardly from the outer periphery of the container 30. However, in an alternative embodiment, such as that shown in FIG. 3 of the second preferred embodiment described in detail below, the outer periphery of the lid 40 may match or be about the same size as or slightly smaller than the outer periphery of the container 30.

Referring to FIG. 2, a gasket 41 preferably extends around and/or below one of the outer periphery or edge of the lid 40 and the container rim 30b for sealing the lid 40 to the container 30. More specifically, when the lid 40 is removed from the container 30, the gasket 41 may extend around and/or be attached to the outer edge or periphery of the lid 40 or the interior surface of the lid 40 proximate the outer edge thereof. Alternatively, the gasket 41 may be extend around and/or be attached to the container rim 30b. The gasket 41 is preferably formed of a resiliently flexible material, such as an elastomeric or rubber material. The gasket 41 may be identical to that disclosed in U.S. Pat. No. 7,947,928, which is herein incorporated by reference in its entirety. However, instead of a circular or ovular cross-sectional shape, the gasket 41 may has a Z or zig-zag shape. Regardless or the cross-sectional shape of the gasket 41, the gasket 41 is preferably at least slightly compressible to create at least a generally liquid-tight seal between the lid 40 and the container rim 30b when the lid 40 is properly placed on the container 30 and a handle 16 is in an engaged position, as described in detail below.

Referring again to FIGS. 1 and 2, the kitchen appliance 10 preferably includes at least one handle 16 pivotally mounted to and extending outwardly or upwardly from one of the exterior surface 13 of the side wall 12b of the housing 12 and the exterior surface 40a of the lid 40. As described in detail below, the at least one handle 16 preferably allows the kitchen appliance 10 to be relatively easily lifted and/or transported, while simultaneously sealing and/or locking the lid 40 onto the container 30 to prevent leakage of the contents within the container 30. More preferably, the kitchen appliance 10 preferably includes two handles 16 equidistantly spaced-apart around the side wall 12b of the housing 12. The handles 16 are preferably in diametrically opposed relation to one another and are disposed along the major axis $A_1$ of the housing 12. However, the handles 16 are not limited to such an orientation or configuration, as the handles 16 may be arranged along the minor axis $A_2$ of the housing 12 or at a position therebetween.

Each handle 16 is preferably pivotable between an engaged position (FIG. 1) and a disengaged position (FIG. 2). In the engaged position, it is preferred that at least a portion of the handle 16 contacts one of the exterior surface 40*a* of the lid 40 and the exterior surface 13 of the side wall 12*b* of the housing 12 to retain the lid 40 in sealing engagement with the container rim 30*b* and at least partially compress the gasket 41 therebetween for inhibiting leakage of the contents from the interior of the container 30. In the engaged position, the handles 16 are preferably grasped by the hand of a user to allow the kitchen appliance 10 to be picked-up and/or transporting without allowing the contents to spill or exit from the interior of the container 10. In the disengaged position (FIG. 2), the same portion of the handle 16, and preferably the entire handle 16, is spaced-apart from the other one of the lid 40 and the side wall 12*b* of the housing 12 to permit the lid 40 to be removed from the container rim 30*b*. The handle 16 is preferably formed of a light-weight, high-strength material, such as a polymeric or metallic material.

Figure 6:
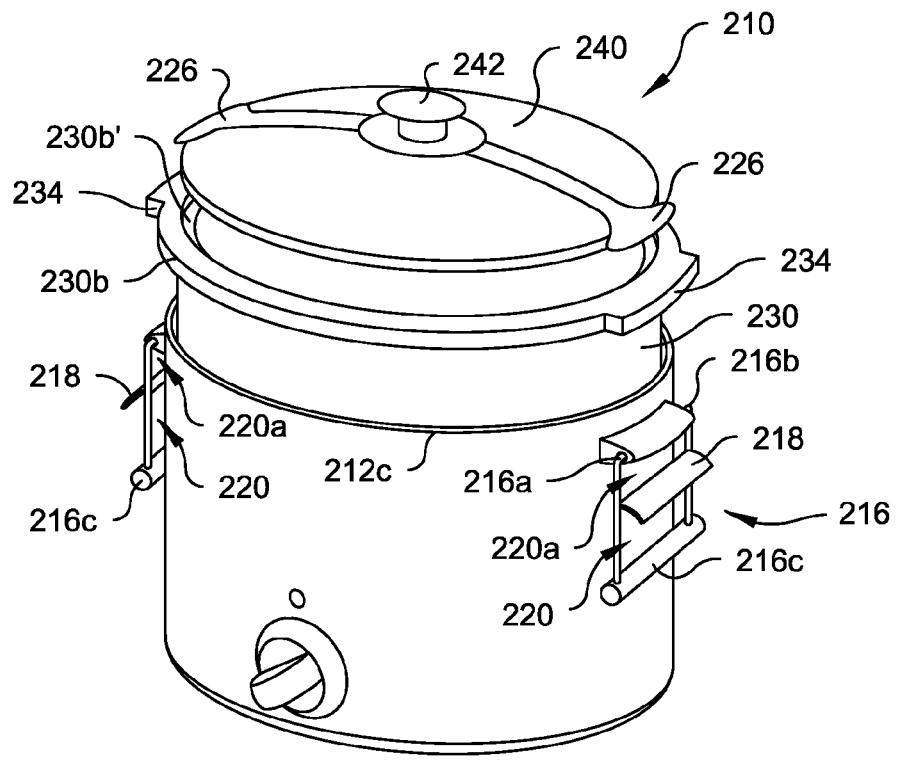
FIG. 6 is a partially exploded top front perspective view thereof, wherein the handle is in the disengaged position.

The handle 16 preferably includes a first end 16*a* and an opposing second end (not shown in FIGS. 1 and 2, but see the second end 216*b* of the handle 216 of the third preferred embodiment shown in FIG. 6). Each of the first (16*a*) and second ends are preferably proximate to and pivotally mounted to one of the exterior surface 13 of the side wall 12*b* of the housing 12 and the exterior surface 40*a* of the lid 40. The major axis A$_1$ of the housing 12 preferably extends through or between the first (16*a*) and second ends of each handle 16. Each handle 16 is preferably pivotable about an axis that extends generally, if not exactly, perpendicular to the major axis A$_1$ of the housing 12. Each of the first (16*a*) and second ends of the handle 16 are preferably positioned below the housing rim 12*c* in both the engaged and disengaged positions.

As shown in FIGS. 1 and 2, a base 28 of the handle 16 may be fixedly attached to one of the exterior surface 13 of the side wall 12*b* of the housing 12 and the exterior surface 40*a* of the lid 40 and preferably extends outwardly or upwardly therefrom. The first (16*a*) and second ends of each handle 16 are preferably pivotally attached to the base 28. A pivot pin (not shown) may extend outwardly from the base 28 and the first (16*a*) and second ends of each handle 16 may be rotatable about the pivot pin. As such, the first (16*a*) and second ends of each handle 16 are preferably laterally spaced-apart from the side wall 12*b* of the housing 12. Alternatively, the first (16*a*) and second ends of each handle 16 may be directly attached to one of the exterior surface 13 of the side wall 12*b* and the exterior surface 40*a* of the lid 40.

Each handle 16 also preferably includes a connection portion 16*c* extending between and/or from the first end 16*a* to the second end. The connection portion 16*c* is preferably the portion of the handle 16 that contacts one of the exterior surface 40*a* of the lid 40 and the exterior surface 13 of the side wall 12*b* of the housing 12 in the engaged position. The connection portion 16*c* preferably extends outwardly and/or upwardly away from the first (16*a*) and second ends of the handle 16. The connection portion 16*c* of each handle 16 is preferably grasped by the hand of the user when the kitchen appliance 10 is lifted and/or transported. In the disengaged position of each handle 16, at least a portion of the connection portion 16*c* may contact a portion of the exterior surface 13 of the side wall 12*b* of the housing 12. An opening 20 is preferably formed between at least a portion of the connection portion 16*c* of the handle 16 and one of the exterior surface 13 of the side wall 12*b* of the housing 12 and the exterior surface 40*a* of the lid 40. The opening 20 is preferably sufficiently sized and/or shaped to allow a user to insert at least at least a portion and preferably his/her entire hand therethrough.

In the first preferred embodiment, the connection portion 16*c* of the handle 16 preferably includes at least one extension 18 extending inwardly or outwardly therefrom when the handle 16 is in the engaged and disengaged positions, respectively. The extension 18 is preferably at least generally rigid and fixedly attached to the connection portion 16*c*. The extension 18 preferably contacts one of the exterior surface 40*a* of the lid 40 and the exterior surface 13 of the side wall 12*b* of the housing 12 in the engaged position of the handle 16. More preferably, each handle 16 preferably includes two spaced-apart extensions 18 that extend inwardly toward the interior of the housing 12 when the handle 16 is in the engaged position. Each extension 18 of the connection portion 16*c* of the handle 16 preferably snaps over at least a portion of the container rim 30*b* when the handle 16 is moved between the engaged position and the disengaged position. In the engaged position, at least a portion of each extension 18 extends over or across the container rim 30*b*.

In use, both handles 16 are preferably placed in or moved to the disengaged position (FIG. 2) when the heating element 14 is activated and/or contents within the interior 30*a* of the container 30 are heated. Otherwise, an undesirable build-up of pressure may occur within the interior 30*a* of the container 30. Once the heating element 14 has been turned "off" and/or the contents within the interior 30*a* of the container 30 are sufficiently heated, at least one and preferably both of the handles 16 are moved from the disengaged position (FIG. 2) to the engaged position (FIG. 1) to generally lock and/or seal the lid 40 onto the container 30 and allow the kitchen appliance 10 to be lifted and/or transported. Once the kitchen appliance 10 has arrived at the desired location, each handle 16 is preferably moved or rotated to the disengaged position (FIG. 2), at which time the heating element 14 may be activated to heat the contents of the container 30 or the lid 40 may be removed from the container 30 to provide access to the interior 30*a* of the container 30. The rotatable and locking/sealing features of the handle 16 eliminate the need for additional structure to be added to the kitchen appliance 10 to inhibit leakage of contents from the interior 30*a* of the container 30.

Figure 3:
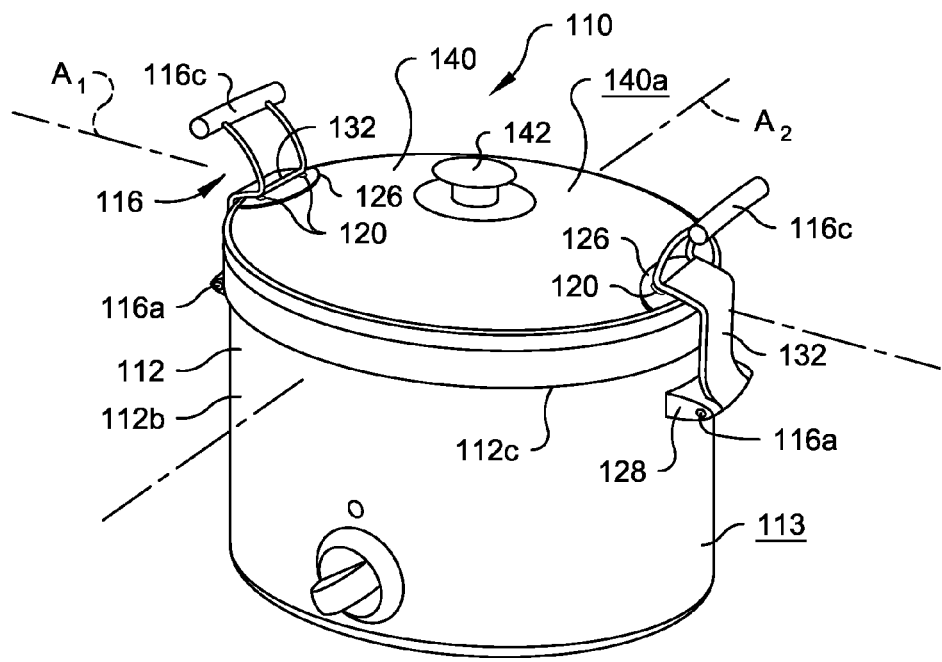
FIG. 3 is a top front perspective view of the kitchen appliance according to a second preferred embodiment of the present disclosure, wherein the handle is in the engaged position.

FIGS. 3 and 4 show a second preferred embodiment of the kitchen appliance 110. The reference numerals of the second preferred embodiment are distinguishable from those of the first preferred embodiment by a factor of one-hundred (100), but otherwise indicate the same elements as indicated in the first preferred embodiment, except as otherwise specified. The kitchen appliance 110 of the second preferred embodiment is substantially similar to that of the first preferred embodiment. The description of certain similarities between the embodiments may be omitted herein for the sake of brevity and convenience, and, therefore, is not limiting.

A distinguishing feature of the second preferred embodiment is that one of the exterior surface 140*a* of the lid 140 and the exterior surface 113 of the side wall 112*b* of the housing 112 includes at least one depression 120 therein. More preferably, the lid 140 includes two spaced-apart depressions 120 therein. Each depression 120 preferably extends from the exterior surface 140*a* of the lid 140 toward the interior surface (not shown) thereof. Each depression 120 may be sized and/or shaped as a generally circular or ovular dimple, but the depressions 120 are not limited to such a configuration. For example, each depression 120 may be an elongated or eccentrically-shaped slot. In a configuration in which the handle 116 is pivotally attached to the exterior surface 113 of the side wall 112*b* of the housing 112, each depression 120 is preferably spaced a predetermined distance inwardly from the outer edge of the lid 140. Each depression 120 may be formed directly in or integrally with the exterior surface 140a of the lid 140 or the exterior surface 113 of the side wall 112b of the housing 112. Alternatively, each depression 120 may be formed in a pad 126 fixedly or removably attached to the exterior surface 140a of the lid 140 or the exterior surface 113 of the side wall 112b of the housing 112. The pad 126 is preferably positioned on the opposite one of the lid 40 and the housing 12 from the base 128. In a preferred embodiment in which the pads 126 are attached or mounted to the lid 140, each pad 126 may be positioned at or inwardly spaced-apart from the outer edge of the lid 140, and each pad 126 is preferably spaced-apart from the lid handle 142.

The connection portion 116c of each handle 116 preferably includes the at least one and more preferably the two spaced-apart extensions 118 (FIG. 4). At least a portion of each extension 118 is preferably complementarily sized and/or shaped to engage at least a portion of one of the depressions 120. More specifically, at least a portion of each extension 118 preferably extends at least partially into one of the depressions 120 when the handle 116 is in the engaged position. The contact of the depressions 120 with the respective extensions 118 is preferably sufficiently strong so as to prevent inadvertent movement of each handle 116 out of the engaged position even when the kitchen appliance 10 is lifted and/or transported by the handles 116. It is preferred that each handle 116 can be removed from the engaged position by apply a sufficient amount of pulling and/or lifting force to the handle 116 to remove the extensions 118 from the respective depressions 120.

In the second preferred embodiment, a plate 132 preferably separates the first end 116a of the handle 116 from the second end (not shown) and extends therebetween. The connection portion 116c of the handle 116 preferably extends at least partially around the plate 132, and at least a portion of the connection portion 116c is preferably spaced-apart from the plate 132. In the engaged position of the handle 116, the plate 132 preferably extends from below the housing rim 112c to above housing rim 112c and at least partially around the housing rim 112c. In the engaged position of the handle 116, at least a portion of the plate 132 preferably contacts at least a portion of the pad 120 to help prevent inadvertent removal of the handle 116 from the engaged position. The plate 132 also preferably provides structural rigidity to the handle 116. The plate 132 is preferably a solid piece that extends continuously from the first end 116a of the handle 116 to the second end thereof and is fixedly attached thereto.

In the engaged position, each handle 116 preferably imparts a downward force on the lid 140. Since the handles 116 are spaced-apart on the outer periphery of the kitchen appliance 10, two separate and spaced-apart forces are preferably imparted onto the lid 140 proximate the outer edge thereof. The two forces are preferably of equal magnitude and preferably provide a symmetry to the kitchen appliance 10 during transport. In the engaged position, the handles 116 combine to at least partially compress the gasket to form and maintain a seal between the lid 140 and the container 130.

Figure 5:
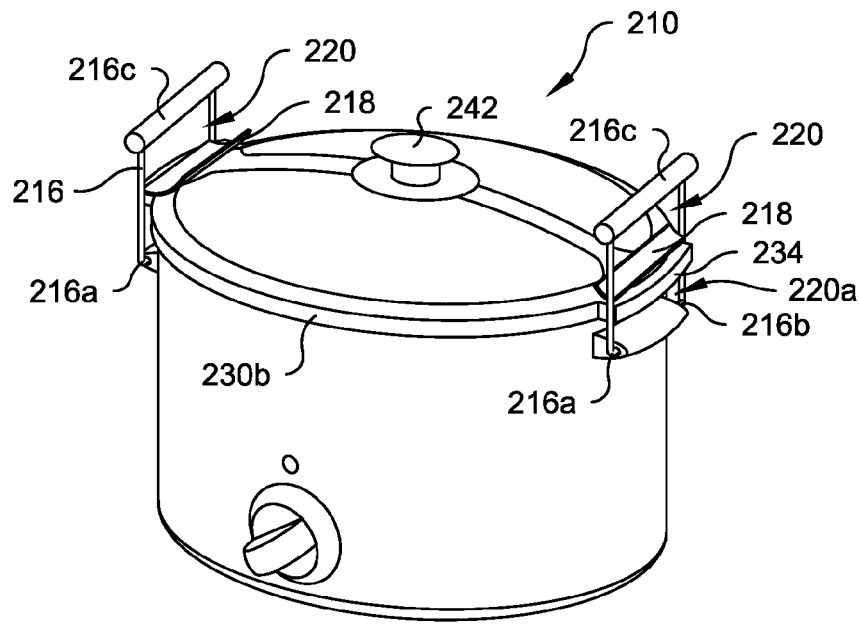
FIG. 5 is a top front perspective view of the kitchen appliance according to a third preferred embodiment of the present disclosure, wherein the handle is in the engaged position.

FIGS. 5 and 6 show a third preferred embodiment of the kitchen appliance 210. The reference numerals of the third preferred embodiment are distinguishable from those of the first preferred embodiment by a factor of two-hundred (200), but otherwise indicate the same elements as indicated in the first preferred embodiment, except as otherwise specified. The kitchen appliance 210 of the third preferred embodiment is substantially similar to the first and second preferred embodiments described above. The description of certain similarities between the embodiments may be omitted herein for the sake of brevity and convenience, and, therefore, is not limiting.

A distinguishing feature of the third preferred embodiment is that the extension 218 of each handle 216 preferably extends across an entire width of the handle 216, as measured from the first end 216a to the second end 216b thereof. In other words, a center or midportion of the extension 218 of each handle 216 is equidistantly spaced between the first end 216a and the second end 216b thereof. In the third preferred embodiment, the extension 218 of each handle 216 is preferably at least slightly arcuate or curved. The opening 220 of each handle 216 is preferably formed between the extension 218 and at least a portion of the connection portion 216c. A second opening 220a of each handle 216 is preferably formed between the extension 218 and the respective base 128.

Referring to FIG. 6, it is preferred that at least a portion of the pad 226 extends outwardly beyond the outer edge of the lid 240 or upwardly beyond the housing rim 212c. Another portion of the pad 226 preferably extends inwardly to the lid handle 242. The container 230 preferably includes two diametrically opposed protrusions 234 extending outwardly beyond the container rim 230b. When the lid 240 is properly placed on the container 230, it is preferred that at least a portion of each pad 226 that extends beyond the outer edge of the lid 240 is aligned with and/or corresponds to at least a portion of one of the protrusions 234. In the engaged position of each handle 216, at least a portion of each pad 226 is preferably at least partially surrounded, sandwiched and/or at least slightly compressed between at least a portion of the extension 218 of one of the handles 216 and a protrusion 234 extending laterally outwardly from the container rim 230b. Further, in the engaged position of each handle 216, it is preferred that one of the protrusions 234 and a portion of one of the pads 226 extends at least partially through the second opening 220a thereof.

Figure 7:
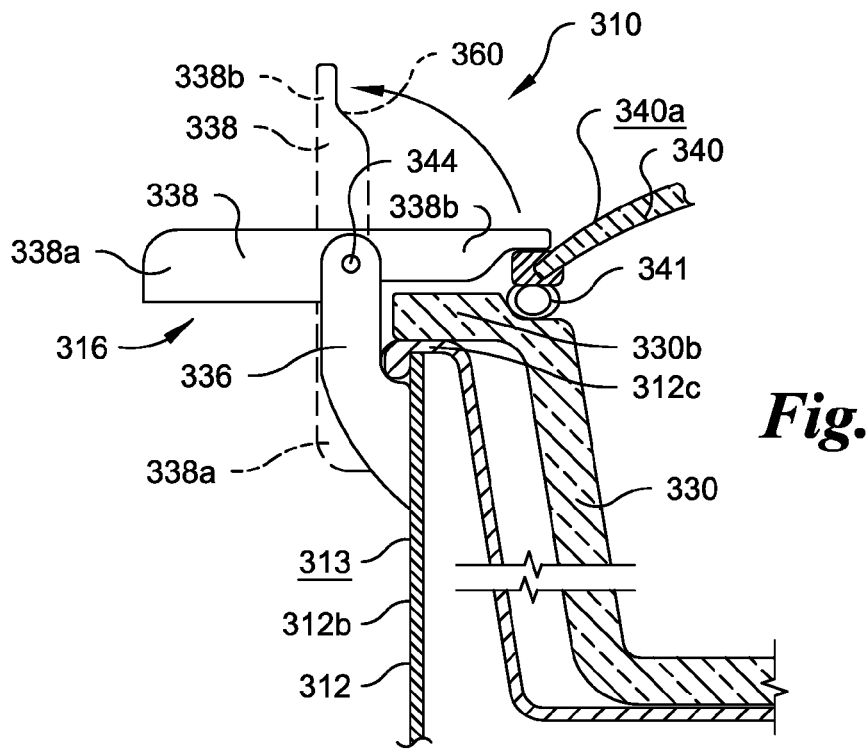
FIG. 7 is an enlarged partially cross-sectional front elevational view of a portion of the kitchen appliance according to a fourth preferred embodiment of the present disclosure, wherein the handle is in the engaged position.
Figure 8:
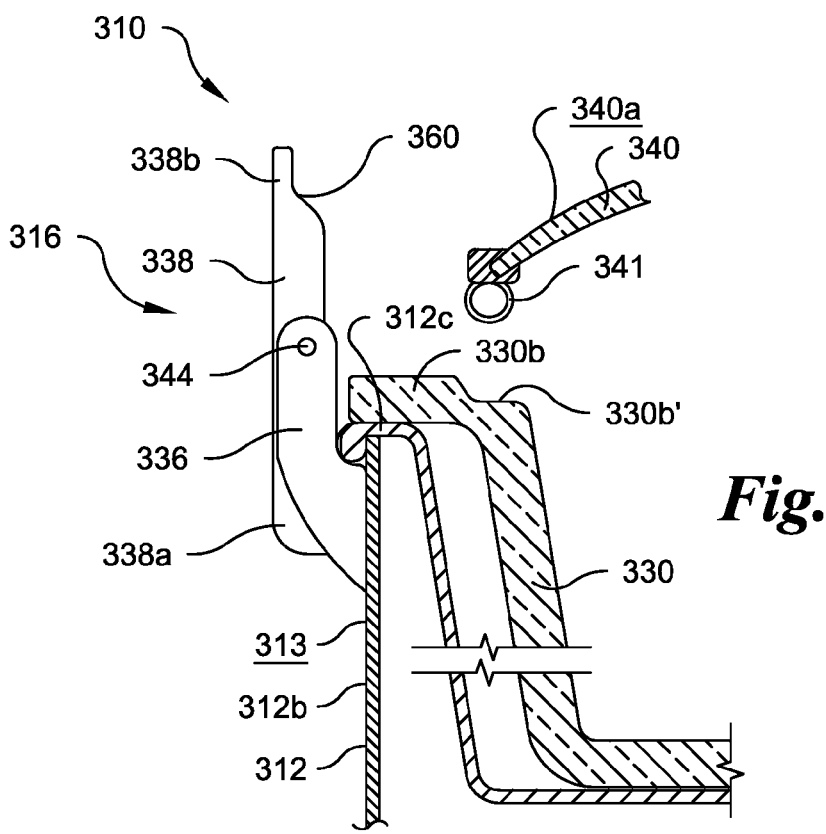
FIG. 8 is an enlarged partially cross-sectional front elevational view of a portion thereof, wherein the handle is in the disengaged position and a lid is separated from a remainder of the kitchen appliance.

FIGS. 7 and 8 show a fourth preferred embodiment of the kitchen appliance 310. The reference numerals of the fourth preferred embodiment are distinguishable from those of the first preferred embodiment by a factor of three-hundred (300), but otherwise indicate the same elements as indicated in the first preferred embodiment, except as otherwise specified. At least certain portions of the kitchen appliance 310 of the fourth preferred embodiment, such as the housing 312, the container 330, the lid 340 and the gasket 341, are substantially similar to that of the first through third preferred embodiments described above. The description of certain similarities between the embodiments may be omitted herein for the sake of brevity and convenience, and, therefore, is not limiting.

A distinguishing feature of the fourth preferred embodiment is that each handle 316 includes a first segment 336, which is fixedly attached to and extends outwardly and/or upwardly from one of the exterior surface 340a of the lid 340 and the exterior surface 313 of the side wall 312b of the housing 312, and a second segment 338, which is pivotally attached to the first segment 336. The first segment 336 of each handle 316 is preferably fixed to the exterior surface 313 of the side wall 312b of the housing 312 below the housing rim 312c. At least a portion of the first segment 336 of each handle 316 preferably extends upwardly and/or outwardly beyond the housing rim 312c and the container rim 330b when the container 330 is placed within the housing 312. The opening (not shown) of each handle 316 may be formed in at least one of the first and second segments 336, 338 thereof. A pivot point 344, such as a pin or dowel, preferably pivotally attaches the first segment 336 of the handle 316 to the second segment 338. The pivot point 344 of each handle 316 is preferably positioned or located above the housing rim 312c and the container rim 330b when the container 330 is placed within the housing 312. The pivot point 344 preferably extends generally parallel to the support surface when the housing 312 is placed thereon and/or generally, if not exactly, perpendicular to the major axis $A_1$ of the housing 312.

At least a portion of each handle 316 is preferably biased toward the disengaged position. More specifically, the second segment 338 of each handle 316 is preferably biased toward the disengaged position. For example, a lower or outer portion 338a of the second segment 338 of each handle 316 may have a greater mass than an upper or inner portion 338b thereof. Alternatively, the second segment 338 may be spring biased toward the disengaged position. In the disengaged position, a least a portion of each handle 316 preferably extends generally perpendicularly to the support surface when the base (not shown in FIGS. 7 and 8) of the housing 312 rests on the support surface. More specifically, as shown in FIG. 8, both the lower portion 338a and the upper portion 338b of the second segment 338 of each handle 316 preferably extend perpendicularly to the support surface when the base (not shown) of the housing 312 rests on the support surface. In the engaged position, at least a portion of the handle 316 extends generally parallel to the support surface. More specifically, as shown in solid lines in FIG. 7, both the lower portion 338a and the upper portion 338b of the second segment 338 of each handle 316 extend parallel to the support surface when the base of the housing 312 rests on the support surface.

When the kitchen appliance 310 is lifted from the support surface and/or transported, a user preferably grasps and/or raises at least the lower portion 338a of the second segment 338 of each handle 316, which preferably causes the upper portion 338a of each handle 316 to rotate inwardly and/or downwardly. When the lower portion 338a of the second segment 338 is raised to a horizontal configuration (shown in solid lines in FIG. 7), the upper portion 338b of the second segment 338a is also moved to a horizontal configuration (shown in solid lines in FIG. 7). In such a position, at least a distal or inner end of the upper portion 338b of the second segment 338a preferably directly contacts a portion of the lid 340 and imparts a downward force on the lid 340. More specifically, the upper portion 338b of the second segment 338 of each handle 316 preferably includes a cut-out or notch 360 therein to accommodate and/or receive at least a portion of the lid 340 in the engaged position of the handles 316. The downward force applied by the second segment 338 of each handle 316 preferably at least partially compresses the gasket 341, which preferably creates at least a generally liquid-tight seal between the lid 340 and the container 330. When the kitchen appliance 310 is placed on the support surface, the bias (i.e., height) of the second segment 338 causes the second segment 338 to pivot to the vertical position (shown in phantom in FIG. 7) to permit the lid 340 to be easily removed from the container 330.

Figure 9:
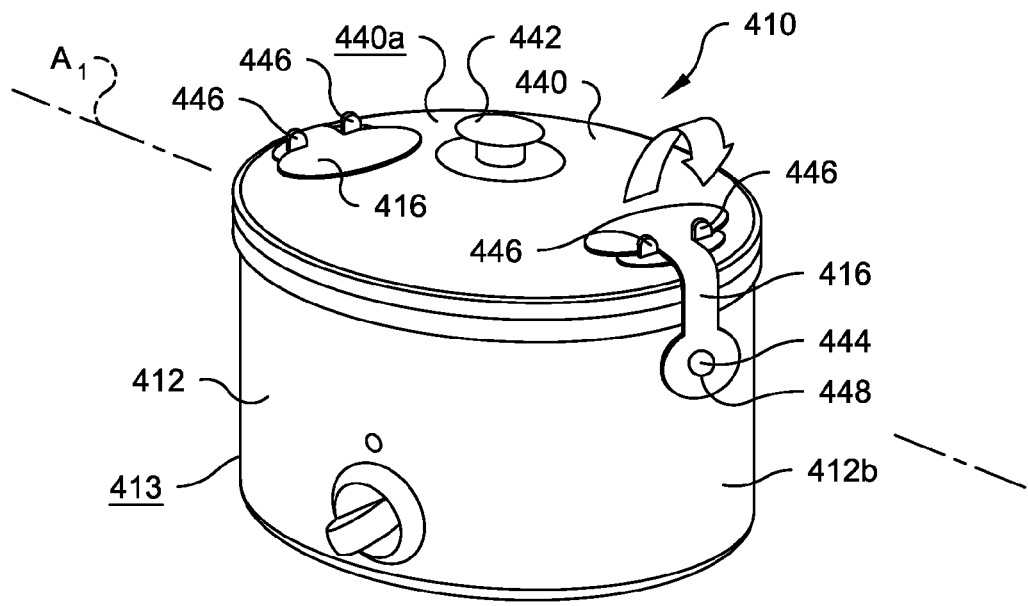
FIG. 9 is a top front perspective view of the kitchen appliance according to a fifth preferred embodiment of the present disclosure, wherein the handle is in the engaged position.
Figure 10:
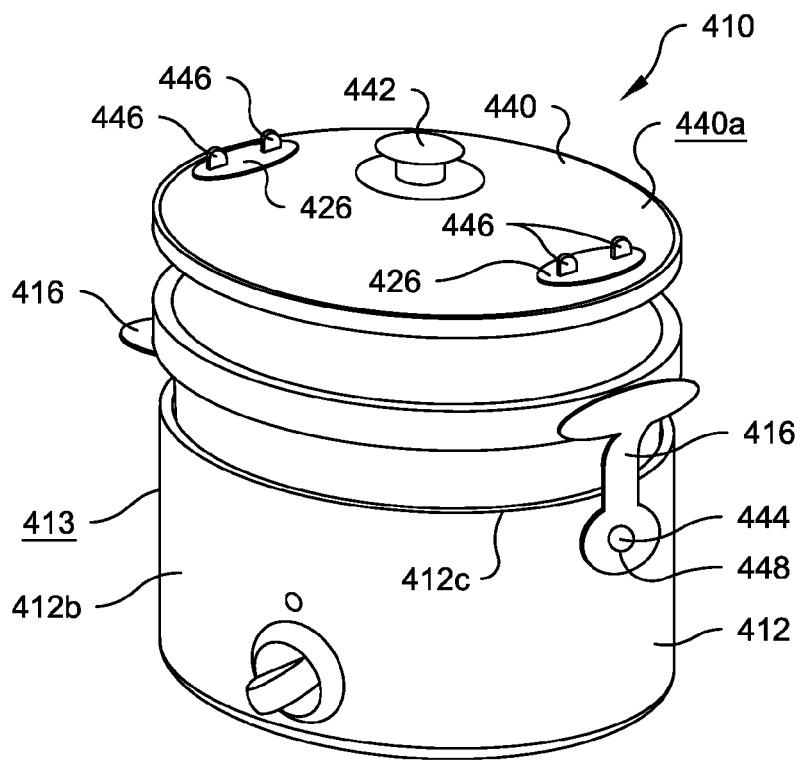
FIG. 10 is a partially exploded top front perspective view thereof, wherein the handle is in the disengaged position.

FIGS. 9 and 10 show a fifth preferred embodiment of the kitchen appliance 410. The reference numerals of the fifth preferred embodiment are distinguishable from those of the first preferred embodiment by a factor of four-hundred (400), but otherwise indicate the same elements as indicated in the first preferred embodiment, except as otherwise specified. The kitchen appliance 410 of the fifth preferred embodiment is substantially similar to that of the first through fourth preferred embodiments described above. The description of certain similarities between the embodiments may be omitted herein for the sake of brevity and convenience, and, therefore, is not limiting.

A distinguishing feature of the fifth preferred embodiment is that one of the exterior surface 440a of the lid 440 and the exterior surface 413 of the side wall 412b of the housing 412 includes at least one and preferably two laterally spaced-apart protrusions 446 extending upwardly and/or outwardly therefrom. More specifically, each protrusion 446 extends upwardly from each pad 426 and is preferably integrally, unitarily and monolithically formed therewith. Each protrusion 446 may be generally planar or may be at least slightly arcuate or at least partially in the shape of a hook. Each handle 416 of the fifth preferred embodiment is preferably formed of a resiliently flexible material, such as an elastomeric or rubber material. Each handle 416 is also preferably a single, unitary and monolithically formed piece. At least a portion of each handle 416 is preferably sufficiently resiliently flexible to extend at least partially over and/or around the outer edge of the lid 440 in the engaged position (FIG. 9) and naturally or automatically return to a generally planar position in the disengaged position (FIG. 10).

One end of each handle 416 is removably attachable to one of the lid 440 and the housing 412 and an opposing end of each handle 416 is preferably fixedly attached to the other of the lid 440 and the housing 412. More specifically, each handle 416 includes a slot 448 that is sized and/or shaped to receive at least a portion of the pivot pin 444 therein. The pivot pint 444 preferably defines an axis that extends outwardly from the side wall 412b of the housing 412 and preferably parallel to the major axis $A_1$ of the housing 412. Each handle 416 may be fixed with respect to one of the pivot pins 444, or each handle 416 may be rotatable about the respective pivot pin 444 so that the entire handle 416 can be rotated or positioned below the housing rim 412c in the disengaged position. An end of each handle 416 generally opposite to the slot 448 preferably has a T-shape. In the engaged position, at least a portion of each handle 416 is preferably positioned between two of the protrusions 446. The engagement of the protrusions 446 with a portion of each handle 416 preferably prevents inadvertent removal of the lid 440 from the housing 412. To place each handle 416 in the disengaged position, each handle 416 is preferably lifted or otherwise removed from between the respective pair of protrusions 446.

To move each handle 416 from the disengaged position (FIG. 10) to the engaged position (FIG. 9), an upper end of each handle 416 is preferably moved inwardly toward a geometric center of the kitchen appliance 10 and/or the lid handle 442. As each handle 416 is moved inwardly, a portion thereof preferably contacts at least a portion of the outer edge of the lid 440, which preferably causes the handle 416 to bend at the outer edge of the lid 440 and impart a downward and/or inward force onto the lid 440. The force is preferably maintained once the upper end of each handle 416 engages and/or surrounds at least a portion of the respective protrusions 446. Once in the engaged position, the connection between the handles 416 and the respective protrusions 446 is preferably sufficiently strong to permit the kitchen appliance 10 to be lifted by the handles 116, such as at a vertical midportion thereof, without causing the handles 416 to become disengaged from the protrusions 446. Alternatively, once the handles 416 are in the engaged position, the entire kitchen appliance 10 may be lifted and/or transported simply by grasping and raising the lid handle 442.

Figure 11:
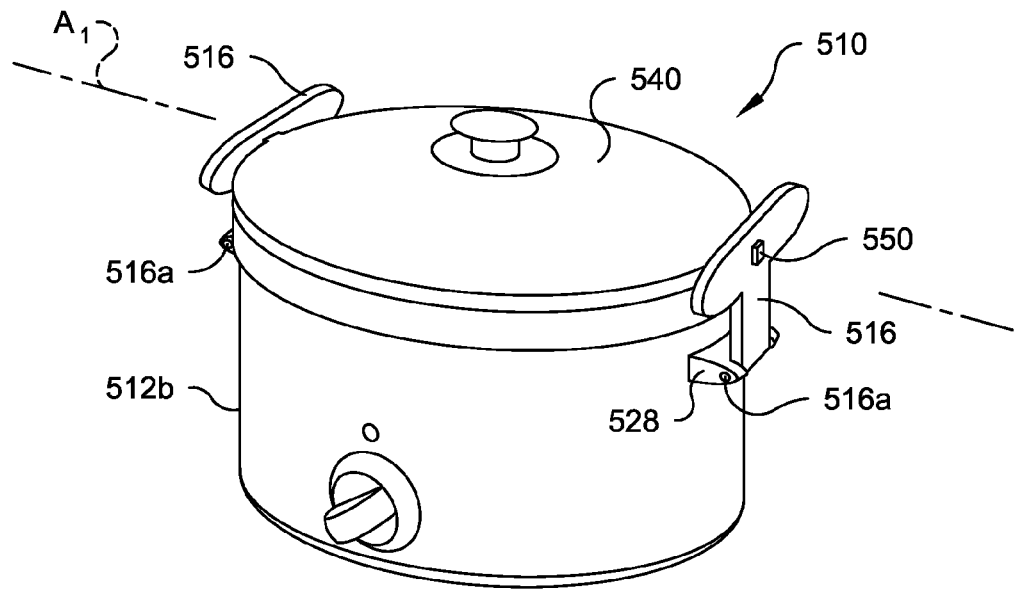
FIG. 11 is a top front perspective view of the kitchen appliance according to a sixth preferred embodiment of the present disclosure, wherein the handle is in the engaged position.
Figure 12:
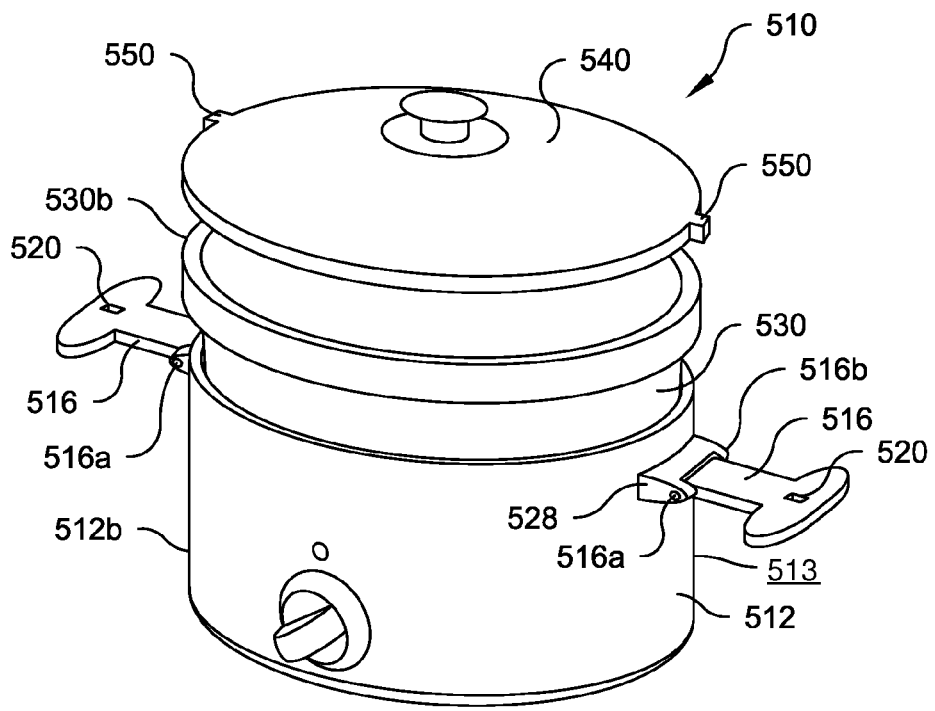
FIG. 12 is a partially exploded top front perspective view thereof, wherein the handle is in the disengaged position.

FIGS. 11 and 12 show a sixth preferred embodiment of the kitchen appliance 510. The reference numerals of the sixth preferred embodiment are distinguishable from those of the first preferred embodiment by a factor of five hundred (500), but otherwise indicate the same elements as indicated in the first preferred embodiment, except as otherwise specified.

The kitchen appliance 510 of the sixth preferred embodiment is substantially similar to that of the first and fifth preferred embodiments described above. The description of certain similarities between the embodiments may be omitted herein for the sake of brevity and convenience, and, therefore, is not limiting.

A distinguishing feature of the sixth preferred embodiment is that at least one and preferably two diametrically opposed catches 550 extend outwardly from one of the lid 540 and the exterior surface 513 of the side wall 512b of the housing 512. More specifically, it is preferred that each catch 550 extends laterally outwardly from the outer edge of the lid 540. In the sixth preferred embodiment, each catch 550 is preferably square or rectangular in shape, but the catches 550 are not limited to be any particular size and/or shape. For example, each catch 550 may be generally circular or ovular in shape, in the shape of a hook, or even eccentrically shaped. When the lid 540 is properly mounted to the container 530 and the container 530 is properly positioned within the housing 512, the catches 550 preferably extend along and/or parallel to the major axis $A_1$ of the housing 512.

Each handle 516 of the sixth preferred embodiment is preferably generally flat or planar in shape, and is preferably formed of a generally rigid material, such as a polymeric or metallic material. The first and second ends 516a, 516b of each handle 516 are preferably pivotally attached to the base 528. Each handle 516 preferably includes the opening 520 that extends completely therethrough. The opening 520 is preferably spaced a predetermined distance inwardly from an outer periphery of the handle 516. In contrast to the opening 20 of the first preferred embodiment described above (see FIG. 1), the opening 520 of the sixth preferred embodiment is smaller in size so as to generally prevent the insertion of the user's hand, or even a portion of a user's finger, therethrough. Instead, the opening 520 of each handle 516 is preferably sized and shaped to receive at least a portion of one of the catches 550, such that at least a portion of each catch 550 occupies the entire respective opening 520. The opening 520 of each handle 516 preferably generally tightly and/or snugly surrounds at least a portion of one of the catches 550 when the handle 516 is in the engaged position. An inner surface of each handle 516 may contact a portion of the outer edge of the lid 540 in the engaged position. In the engaged position, the handle 516 preferably does not extend over and/or around the outer edge of the lid 540 due to each catch 550 extending outwardly beyond the outer edge of the lid 540.

To lock and/or seal the lid 540 to the remainder of the kitchen appliance 510, the outer periphery of the lid 540 is preferably placed on and/or aligned with the container rim 530b. Next, the lid 540 is preferably pushed and/or forced at least slightly downwardly (such as by the hand of the user) to at least partially compress the gasket between the lid 540 and the container rim 530b. In this slightly downward position of the lid 540, the catches 550 of the lid 540 are preferably sufficiently vertically positioned so as to be capable of being received in the opening 520 of the respective handle 516 when the handles 516 are in the engaged position (FIG. 11). An upward force created by the bias of the at least partially compressed gasket in the engaged position of the handles 516 preferably helps to maintain the catches 550 within the opening 520 of the respective handle 516 by increasing the friction and/or engagement forces between the catches 550 and the respective opening 550. The entire kitchen appliance 510 can then be lifted by grasping at least a portion of the upper end of one or both of the handles 516, while maintaining the lid 540 in a sealed and/or locked configuration. To remove the handles 516 from the engaged position, a user may need to apply a downward force to the lid 540 to reduce the friction and/or engagement forces between the catches and the openings 520, thereby allowing the handles 516 to be rotated away from the lid 540 to the disengaged position.

Figure 13:
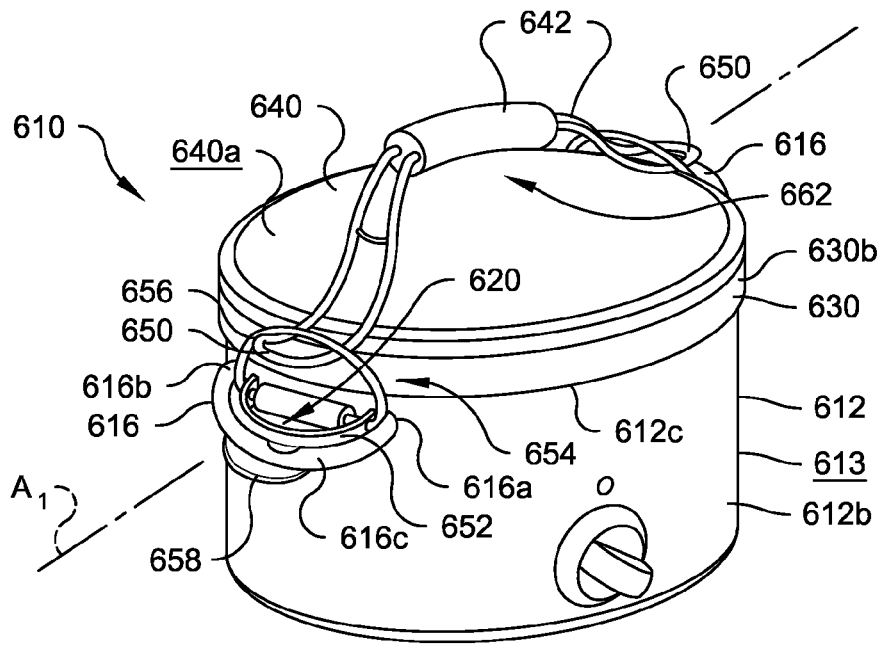
FIG. 13 is a top front perspective view of the kitchen appliance according to a seventh preferred embodiment of the present disclosure, wherein the handle is in the engaged position.
Figure 14:
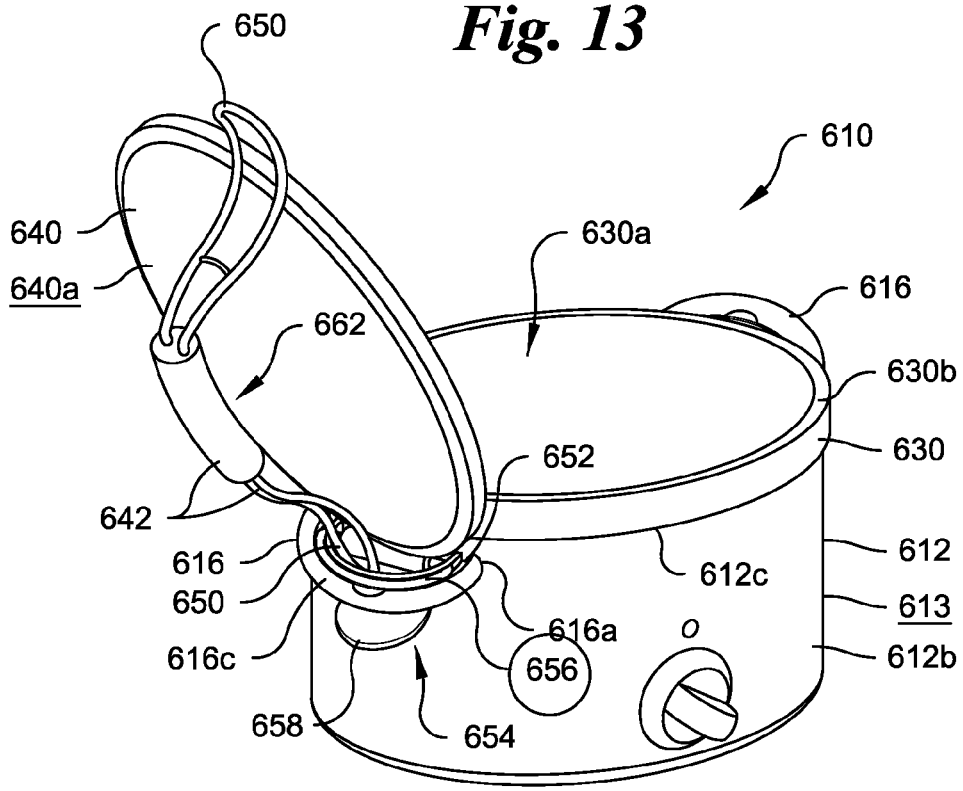
FIG. 14 is a top front perspective view thereof, wherein the handle is in the disengaged position and the lid is rested in an open position within a portion of the handle.

FIGS. 13 and 14 show a seventh preferred embodiment of the kitchen appliance 610. The reference numerals of the seventh preferred embodiment are distinguishable from those of the first preferred embodiment by a factor of six hundred (600), but otherwise indicate the same elements as indicated in the first preferred embodiment, except as otherwise specified. At least portions of the kitchen appliance 610 of the sixth preferred embodiment, such as the housing 612, the container 630 and the lid 640 are substantially similar to those of the first through sixth preferred embodiments described above. The description of certain similarities between the embodiments may be omitted herein for the sake of brevity and convenience, and, therefore, is not limiting.

A distinguishing feature of the seventh preferred embodiment is that the lid handle 642 extends across an entire width or length of the lid 640. When the lid 640 is properly mounted to the container 630 and the container 630 is properly positioned within the housing 612, the lid handle 642 preferably extends along and/or parallel to the major axis $A_1$ of the housing 612. The lid handle 642 is preferably directly attached to the exterior surface 640a of the lid 640 proximate opposing ends thereof and proximate the outer edge of the lid 640. A midportion of the lid handle 642 is preferably spaced-apart or above the exterior surface 640a of the lid 640 such that a passageway 662 is formed therebetween. The entire kitchen appliance 610 can be lifted and/or transported by inserted at least a portion of the user's hand into the passageway 662 and grasping and/or engaging the midportion.

Opposing ends of the lid handle 642 each preferably include the catch 650 that extends at least slightly outwardly beyond the outer edge of the lid 640. The catches 650 are preferably an outer extension of the lid handle 642 and are preferably integrally, unitarily and monolithically formed therewith. In other words, a first end of the lid handle 642, such as one of the two catches 650, preferably extends outwardly beyond an outer periphery of the lid 640 at a first location and an opposing second end of the lid handle 642, such as the other catch 650, preferably extends outwardly beyond the outer periphery of the lid 640 at a second location diametrically opposed to the first location. At least a portion of each catch 650 is preferably at least slightly arcuate or curved in shape and preferably extends at least slightly upwardly beyond at least a portion of the exterior surface 640a of the lid 640. It is preferred that each catch 650 is structural rigid.

Each handle 616 of the seventh preferred embodiment is preferably mounted to the exterior surface 613 of the side wall 612b of the housing 612 and positioned completely below the housing rim 612c. In contrast to the handles 16, 116, 216, 316, 416, 516 of the first through sixth preferred embodiments described above, each handle 616 of the seventh preferred embodiment is preferably entirely fixed to the exterior surface 613 of the side wall 612b of the housing 612. The first end 616a and the second end 616b of each handle 616 is preferably fixed to the exterior surface 613 of the side wall 612 of the housing 612. The connection portion 616c of each handle 616 preferably extends in an arcuate manner from the first end 616a to the second end 616b thereof. The opening 620 is preferably formed between the connection portion 616c of each handle 616 and the exterior surface 613 of the side wall 612b of the housing 612. As shown in FIG. 14, at least a portion of one of the catches 650 of the lid handle 642 is preferably insertable into the opening 620 of either handle 616 to support the lid 640 in an open position with respect to the container 630. The open position of the lid 640 permits access to the interior 630a of the container 630 while maintaining the lid 640 above the support surface. An arcuate or curved groove 652 is preferably formed in a top surface of each handle 616 and preferably extends from the first end 616a to the second end 616b thereof.

The kitchen appliance 610 of the seventh preferred embodiment preferably includes at least one and preferably two diametrically opposed latching mechanisms 654 for selectively retaining the lid 640 in sealing engagement with the container rim 630b for inhibiting or preventing leakage of the foodstuff from within the interior 630a of the container 630. Each latching mechanism 654 is generally an over-the-center clip having at least a wire hook 656 and a lever 658, and more preferably each latching mechanism 654 includes the hook 656, the lever 658 and one of the catches 650. It is preferred that manipulation of the lever 658 causes engagement or release of the hook 656 of the latching mechanism 654. At least a portion of the hook 656 is preferably sized and shaped to at least partially surround and/or engage one of the catches 650.

The latching mechanism 654 is preferably mounted or attached to the exterior surface 613 of the side wall 612b of the housing 612 proximate the housing rim 612c thereof. Each latching mechanism 654 is preferably aligned with and/or at least partially surrounded by one of the handles 616. However, one or both of the latching mechanisms 654 may be attached to the exterior surface 640a of the lid 640. Preferably, the hook 656 is selectively releasably engagable with one of the catches 650 and/or the lid 640 with movement of the lever 658 to selectively retain the lid 640 in sealing engagement with the container rim 630b. Specifically, it is preferred that, when in an engaged position (FIG. 13), the latching mechanism 654 retains the lid 640 in sealing engagement with the container rim 630b to at least slightly compress the gasket (not shown), and, when in a released or disengaged position (FIG. 14, for example), the hook 656 is removed from engagement with the catch 650 and/or the lid 640 so that the lid 640 can be removed from the container 630 in order to allow access to the interior 630a of the container 630. In the engaged position, it is preferred that at least a portion of the hook 656 engages and/or rests within at least a portion of one of the catches 650 of the lid handle 642. In the disengaged position of the latching mechanism 654, at least a portion of the hook 656 preferably directly contacts at least a portion of the respective handle 616. More preferably, the hook 656 of each latching mechanism 654 preferably rests within the groove 652 of one of the handles 616 in the disengaged position of the latching mechanism 654.

When the hook 654 is placed in and/or engages one of the catches 650, the lever 658 of the latching mechanism 654 can be rotated downwardly and inwardly toward the side wall 612b of the housing 612 to create a retaining force exerted by the latching mechanism 654 on one of the catches 650 and/or the lid 640 in order to retain the lid 640 on the container rim 630b. To release the latching mechanism 654, the lever 658 is preferably rotated outwardly and upwardly with respect to the side wall 612b of the housing 612 to release the retaining force. Once in this position, the hook 656 of the latching mechanism 654 can be removed from engagement with the catch 650 to place the latching mechanism 654 in the disengaged position and enable the lid 640 to be removed from engagement with the container rim 630b. Those skilled in the art understand when the preferred positioning of the latching mechanism 654 and the catch 650 are reversed, the lever 658 of the latching mechanism 654 is preferably rotated upwardly to retain the lid 640 on the container rim 630b, and downwardly to release the lid 640 from the container rim 630b.

Preferably, the latching mechanism 654 exerts a sufficient amount of retaining force on the lid 640 to at least partially compress at least a substantial portion of the gasket of the lid 640 with the container rim 630b, preferably creating a sufficient seal therebetween to inhibit leakage of the contents, particularly liquids, from within the interior 630a (FIG. 14) of the container 630. While it is preferred that the latching mechanism 654 be of the over-the-center type, the latching mechanism 654 may be of a different type, provided it is capable of functioning in the manner described herein. Further, while it is preferred that the latching mechanisms 654 are each aligned with one of the handles 616, the latching mechanisms 654 may be arranged differently with respect to the housing 612, provided the latching mechanisms 654 are capable of functioning to retain the lid 640 in engagement with the container rim 630b such that the gasket is in sealing engagement with the container rim 330b.

FIGS. 15-17B show an eighth preferred embodiment of the kitchen appliance 710. The reference numerals of the eighth preferred embodiment are distinguishable from those of the first preferred embodiment by a factor of seven hundred (700), but otherwise indicate the same elements as indicated in the first preferred embodiment, except as otherwise specified. At least portions of the kitchen appliance 710 of the eighth preferred embodiment, such as the housing 712, the container 730, the lid 740 and the gasket 741, are substantially similar to those of the first and seventh preferred embodiments described above. The description of certain similarities between the embodiments may be omitted herein for the sake of brevity and convenience, and, therefore, is not limiting.

The kitchen appliance 710 of the eighth preferred embodiment includes the at least one catch 750 and preferably two diametrically opposed catches 750 mounted to one of the exterior surface 740a of the lid 740 and the exterior surface 713 of the side wall 712b of the housing 712. Each catch 750 preferably extends outwardly beyond the outer edge of the lid 740 or upwardly beyond the side wall 712b of the housing 712. At least a portion of each catch 750 is preferably formed of a material that is resiliently flexible or bendable, or the structure of each catch 750 is configured to be resiliently flexible or bendable. More specifically, each catch 750 preferably includes a resiliently flexible or bendable midportion 750c that is surrounded by two generally rigid portions 750a, 750b. The distal portion 750a of each catch 750 preferably forms a generally U-shaped loop or enclosure. At least a portion of the proximal portion 750b of each catch 750 may be fixedly attached to the lid handle 742 and/or a portion of the lid 740 so as to fix the lid handle 742 to the lid 740.

Similar to the seventh preferred embodiment described in detail above, each catch 750 is preferably formed at one of two opposing ends of the lid handle 742 mounted to the exterior surface of the lid 740. In other words, a first end of the lid handle 742, and preferably one of the two catches 750, extends outwardly beyond an outer periphery of the lid 740 at a first location and an opposing second end of the lid handle 742, and preferably the other catch 750, extends outwardly beyond the outer periphery of the lid 740 at a second location diametrically opposed to the first location. When the lid 740 is properly mounted to the container 730 and the container 730 is properly positioned within the housing 712, the midportion 750c of each catch 750 is preferably capable of extending around and/or bending over the container rim 730b and/or the housing rim 712c. Thus, as shown in FIGS. 17A and 17B, the midportion 750c allows each catch 750 to simultaneously extend at least partially in a vertical plane and at least partially in a horizontal plane.

Figure 15:
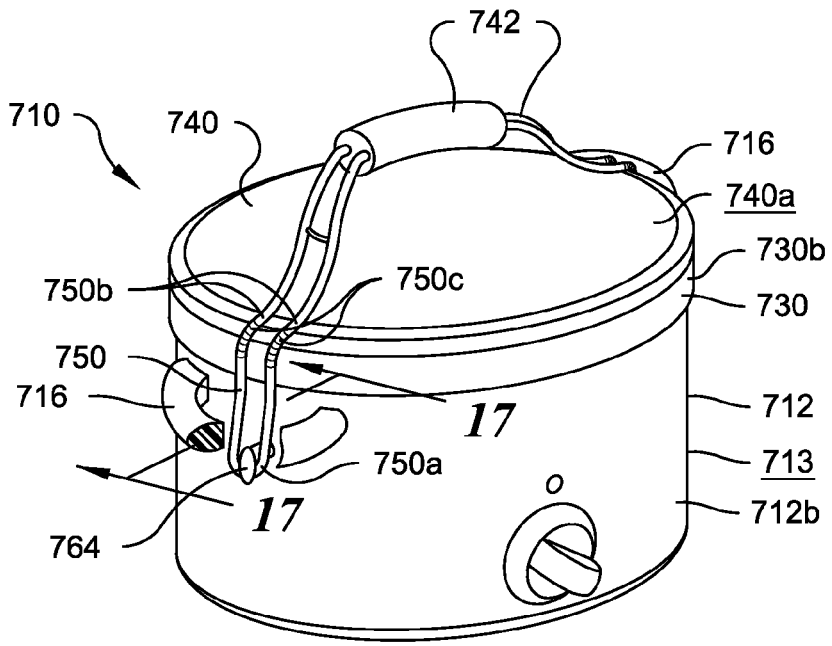
FIG. 15 is a top front perspective partially cut-away view of the kitchen appliance according to a eighth preferred embodiment of the present disclosure, wherein the handle is in the engaged position.
Figure 16:
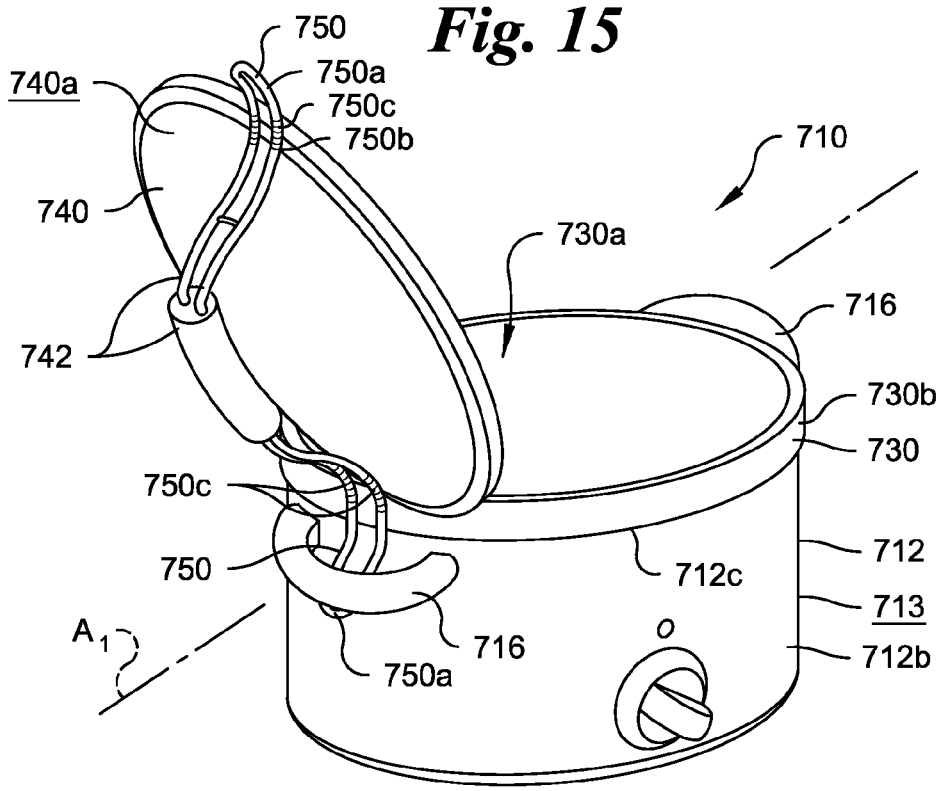
FIG. 16 is a top front perspective view thereof, wherein the handle is in the disengaged position and the lid is rested in an open position within a portion of the handle.
Figure 17A:
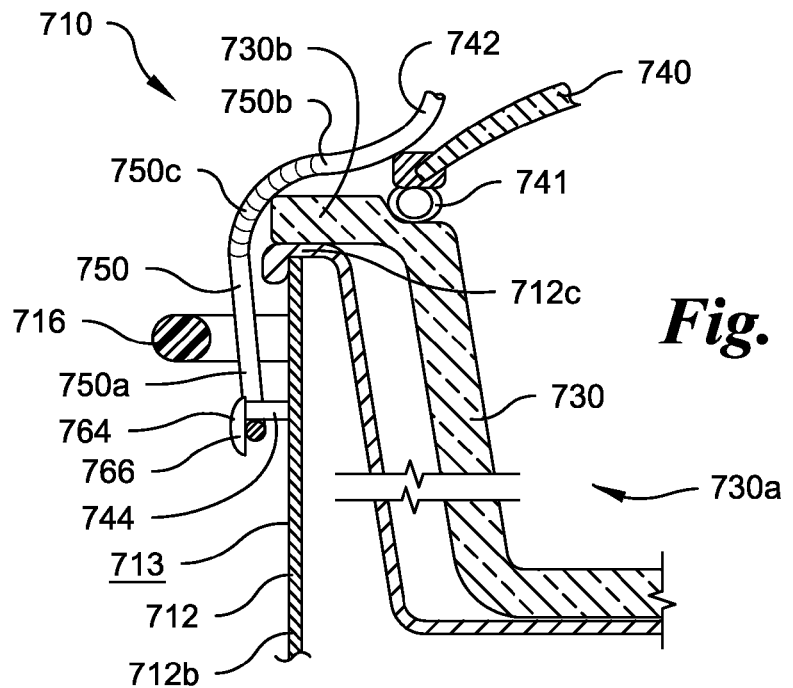
FIG. 17A is an enlarged cross-sectional front elevational view of a portion thereof taken along line 17-17 of FIG. 15 when the handle is in the engaged position.
Figure 17B:
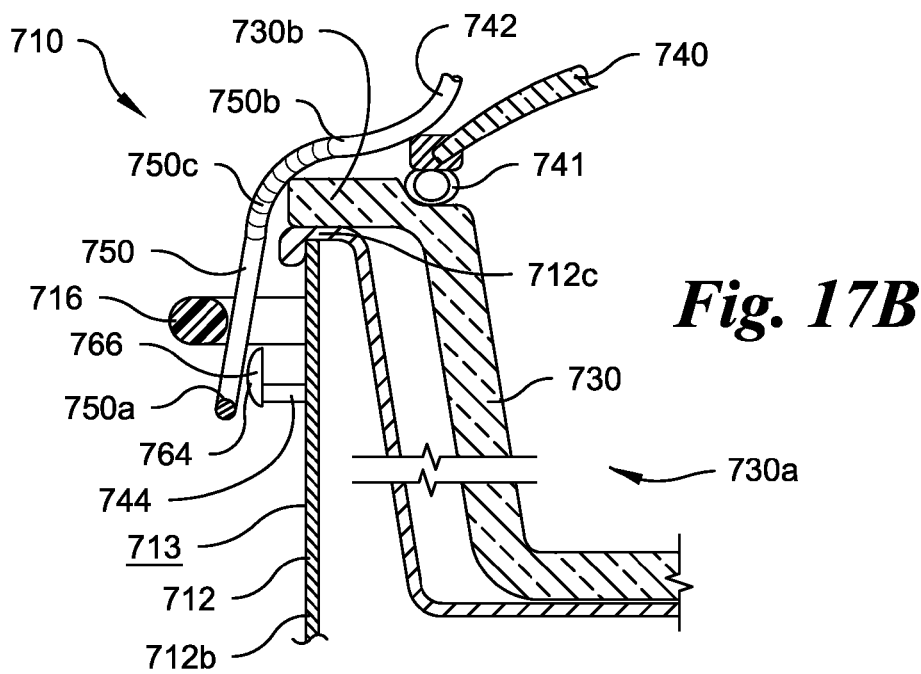
FIG. 17B is an enlarged cross-sectional front elevational view of a portion thereof taken along line 17-17 of FIG. 15 when the handle is in the disengaged position.

Referring to FIGS. 15, 17A and 17B, the kitchen appliance 710 includes at least one tab 764 preferably rotatably mounted to one of the exterior surface 713 of the side wall 712b of the housing 712 and the exterior surface 740a of the lid 740. More specifically, it is preferred that the kitchen appliance 710 includes two diametrically spaced-apart tabs 764 extending along and/or parallel to the major axis $A_1$ of the housing 712 and outwardly from the exterior surface 713 of the side wall 712b of the housing 712. Each tab 764 is preferably aligned with and/or at least partially surrounded by one of the handles 716. Each tab 764 includes the pivot pin 744 extending outwardly from the exterior surface 713 of the side wall 712 of the housing 712 and a head 766 extending outwardly from the pivot pin 744. The pivot pin 744 may be rotatable with respect to the side wall 712b of the housing 712 and the head 766 may be fixed to the pivot pin 744. Alternatively, the pivot pin 744 may be fixed with respect to the side wall 712b of the housing and the head 766 may be rotatable with respect to the pivot pint 744. As shown in FIGS. 17A and 17B, it is preferred that each tab 764, including the pivot pin 744 and the head 766 thereof, is positioned entirely below the housing rim 712c and the respective handle 716. However, at least a portion of each tab 764 may extend above the housing rim 712c and/or a portion of the respective handle 716.

To seal and/or lock the lid 740 to the container 730, at least a portion of each catch 750 is preferably positionable around and/or within at least a portion of one of the tabs 764. More specifically, the loop or enclosure of the distal portion 750a of each catch 750 preferably surrounds at least the pivot pin 744 of one of the tabs 764. To remove the lid 740 from the container 730, the distal portion 750a of each catch 750 is preferably moved over and/or beyond the head 766 of one of the tabs 764 and outwardly from the exterior surface 713 of the side wall 712b of the housing 712. In such a position, the catches 750 preferably do no prevent the lid 740 from being moved upwardly away from the container 730 to access the interior 730a thereof.

More specifically, it is preferred that at least a portion of each tab 764, such as the head 766 thereof, is rotatable between a first or downward position (see FIGS. 15 and 17A) and a second or upward position (see FIG. 17B). In the first position, the tab 764 preferably applies a downward force on the distal portion 750a of the catch 750 to retain the lid 740 in sealing engagement with the container rim 730b by at least partially compressing the gasket 741 for inhibiting leakage of the contents from the interior of the container 730. In the second position, the distal portion 750a of each catch 750 is preferably capable of being disengaged from the pivot pin 744 and/or the head 766 of the respective tab 764 to permit the lid 740 to be removed from the container rim 730b. Each catch 750 preferably extends generally perpendicularly to a plane defined by the housing rim 712c when the catch 750 engages the respective tab 764 in the first position.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

We claim:

1. A kitchen appliance comprising:
    a housing having a base and a side wall extending therefrom, the side wall having an exterior surface and an opposing interior surface, at least portions of the interior surface of the side wall and base defining a cavity within the housing, the housing having a housing rim at a first, free edge of the side wall defining an opening to the cavity;
    a heating or cooling element disposed within the housing proximate the cavity to heat or cool the cavity;
    a container having a generally hollow interior and a container rim defining an opening for accessing the interior thereof, the interior being capable of retaining contents therein, the container being sized and shaped to fit within the cavity of the housing;
    a lid sized and shaped to at least partially cover the opening of the container when placed on the container, the lid having an exterior surface and an opposing interior surface facing the interior of the container when the lid is placed on the container;
    at least one handle pivotally mounted to one of the exterior surface of the side wall of the housing and the exterior surface of the lid, the handle being pivotable between an engaged position in which at least a portion of the handle contacts one of the lid and the side wall of the housing to retain the lid in sealing engagement with the container rim for inhibiting leakage of the contents from the interior of the container and a disengaged position in which the portion of the handle is spaced-apart from the other one of the lid and the side wall of the housing to permit the lid to be removed from the container rim;
    the handle includes a first end, an opposing second end and a connection portion extending therebetween and further comprising an arcuate extension extending across an entire width of the handle as measured from the first end to the second end and an opening in the handle formed between the extension and at least a portion of the connection portion; and
    a gasket extending around one of an outer edge of the lid and the container rim for sealing engagement with the other of the container rim and the outer edge of the lid, the gasket being at least partially compressed when the at least one handle is in the engaged position.

2. The kitchen appliance according to claim 1, wherein each of the first end and the second end being pivotally mounted to one of the exterior surface of the side wall of the housing and the exterior surface of the lid.

3. The kitchen appliance according to claim 2, wherein the extension extends inwardly from the connection portion of the handle, the extension being fixed with respect to the connection portion, the extension contacting one of the exterior surface of the lid and the exterior surface of the side wall of the housing in the engaged position.

4. The kitchen appliance according to claim 3, wherein the extension of the connection portion of the handle snaps over at least a portion of the container rim when the handle is moved from the disengaged position to the engaged position.

5. The kitchen appliance according to claim 1, wherein the lid further comprises a pad with at least a portion of the pad extending outwardly beyond an outer edge of the lid.

6. The kitchen appliance according to claim 1, wherein one of the exterior surface of the lid and the exterior surface of the side wall of the housing includes at least one depression and the handle includes at least one complementary extension, the extension being fixedly attached to the handle, the extension extending at least partially into the depression when the handle is in the engaged position.

7. The kitchen appliance according to claim 1, wherein at least a portion of the handle is biased toward the disengaged position.

8. The kitchen appliance according to claim 1, wherein in the disengaged position at least a portion of the handle extends generally perpendicularly to a support surface when the base of the housing rests on the support surface, and wherein in the engaged position the portion of the handle extends generally parallel to the support surface.

9. The kitchen appliance according to claim 8, wherein a pivot point of the handle is located above the container rim.

10. The kitchen appliance according to claim 1, wherein one of the exterior surface of the lid and the exterior surface of the side wall of the housing includes two laterally spaced-apart protrusions, at least a portion of the handle being positioned between the protrusions when in the engaged position.

11. The kitchen appliance according to claim 1, wherein the handle is formed of an elastomeric material.

12. The kitchen appliance according to claim 11, wherein the handle includes an opening therein, one of the exterior surface of the lid and the exterior surface of the side wall of the housing including a catch extending outwardly therefrom, the opening of the handle surrounding at least a portion of the catch when the handle is in the engaged position.

\* \* \* \* \*